United States Patent
Anusha et al.

(10) Patent No.: US 11,276,100 B2
(45) Date of Patent: Mar. 15, 2022

(54) SYSTEM AND METHOD FOR PREDICTION OF SELLABILITY OF FASHION PRODUCTS

(71) Applicant: Myntra Designs Private Limited, Bangalore (IN)

(72) Inventors: Prakash Anusha, Bangalore (IN); Makkapati Vishnu Vardhan, Bangalore (IN); Arora Sagar, Bangalore (IN)

(73) Assignee: Myntra Design Private Limited, Bangalore (IN)

( * ) Notice: Subject to any disclaimer, the term of this patent is extended or adjusted under 35 U.S.C. 154(b) by 411 days.

(21) Appl. No.: 15/979,641

(22) Filed: May 15, 2018

(65) Prior Publication Data

US 2019/0236677 A1    Aug. 1, 2019

(30) Foreign Application Priority Data

Jan. 30, 2018  (IN) .............................. 201841003360

(51) Int. Cl.
G06Q 30/00       (2012.01)
G06Q 30/06       (2012.01)
G06N 20/00       (2019.01)
G06Q 10/08       (2012.01)

(52) U.S. Cl.
CPC ......... G06Q 30/0631 (2013.01); G06N 20/00 (2019.01); *G06Q 10/087* (2013.01)

(58) Field of Classification Search
CPC ... G06Q 30/0601–0645; G06Q 10/087; G06N 20/00
See application file for complete search history.

(56) References Cited

U.S. PATENT DOCUMENTS

2016/0260110 A1*  9/2016  Ray .................... G06Q 30/0202
2018/0349795 A1* 12/2018  Boyle ............... G06F 16/24578
2019/0073335 A1*  3/2019  Foley ................. G06Q 30/0601

OTHER PUBLICATIONS

"Zhao, Kui, 'Sales Forecast in E-commerce using Convolutional Neural Network', Aug. 26, 2017, http://arxiv.org/abs/1708.07946, pp. 1-8" (Year: 2017).*

* cited by examiner

*Primary Examiner* — Marissa Thein
*Assistant Examiner* — Maria S. P. Heath
(74) *Attorney, Agent, or Firm* — BakerHostetler

(57) ABSTRACT

A system and method for predicting sellability of a fashion product is provided. The system includes a memory having computer-readable instructions stored therein. The system further includes a processor configured to access one or more catalogue images of a fashion product. The processor is configured to determine a plurality of visual attributes of the fashion product. The processor is further configured to determine a plurality of non-visual attributes corresponding to the fashion product. In addition, the processor is configured to estimate a first sellability confidence value for the reference fashion style using a deep learning model. The first sellability confidence value is estimated based upon the visual attributes. Further, the processor is configured to estimate a second sellability confidence value for the reference fashion style using a non-visual parameter model. The second sellability confidence value is estimated based upon the non-visual attributes. Moreover, the processor is configured to combine the first and second sellability confidence values to determine an aggregate sellability confidence value associated with the reference fashion style.

20 Claims, 7 Drawing Sheets

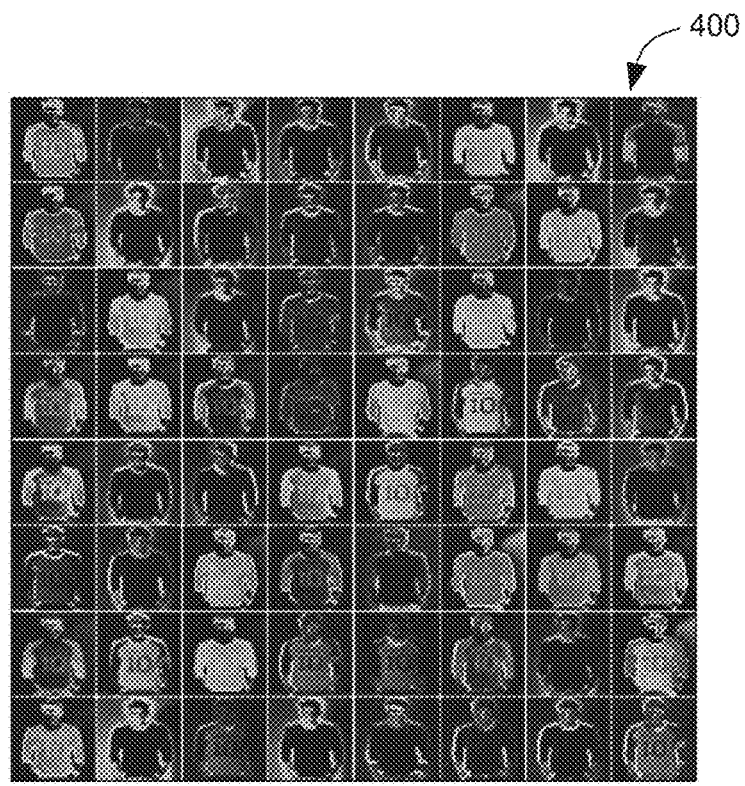
FIG. 4-A
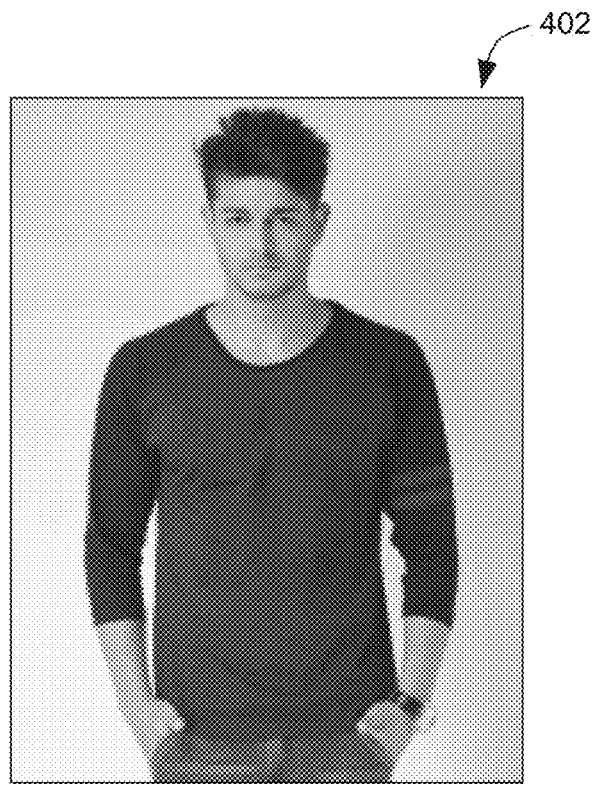
FIG. 4-B

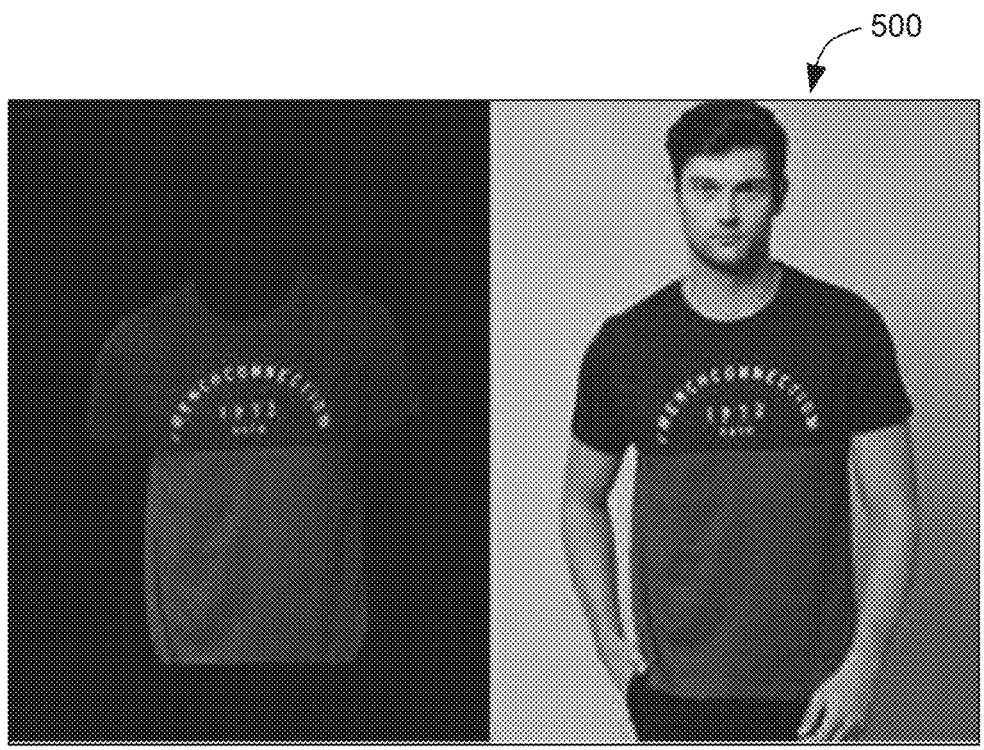
FIG. 5-A
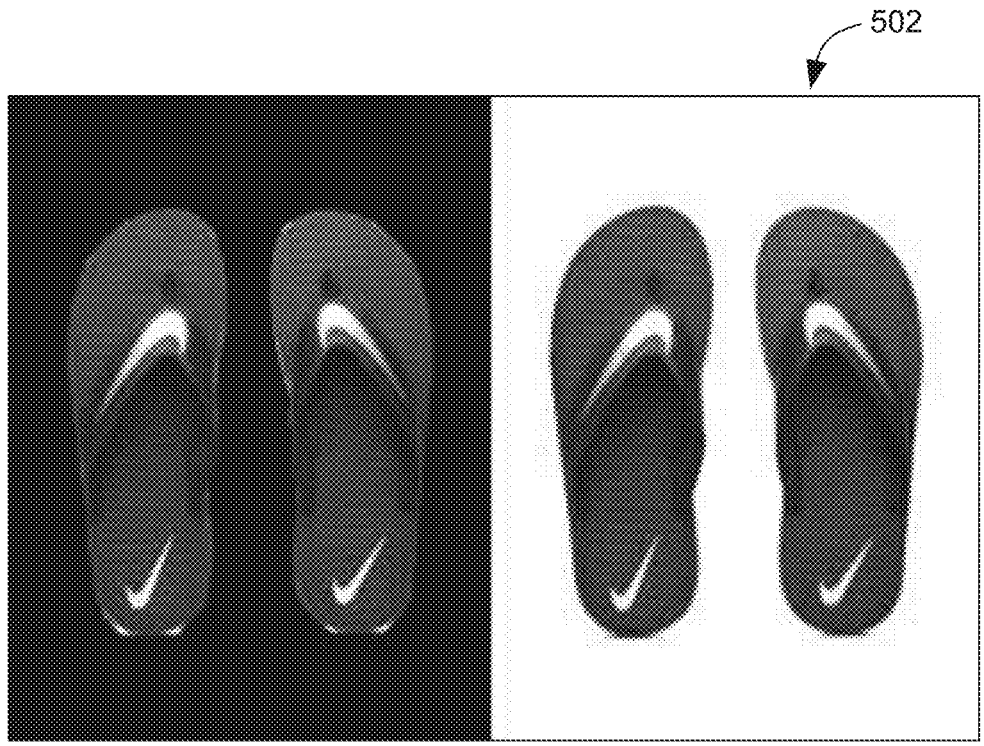
FIG. 5-B

SYSTEM AND METHOD FOR PREDICTION OF SELLABILITY OF FASHION PRODUCTS

PRIORITY STATEMENT

The present application claims priority under 35 U.S.C. § 119 to Indian patent application number 201841003360 filed 30 January, 2018, the entire contents of which are hereby incorporated herein by reference.

FIELD

Embodiments of the invention generally relates to a system for prediction of sales potential or sellability of fashion products, and more particularly to a system and method for determining a sellability confidence corresponding to a variety of fashion styles available for sale on an e-commerce platform.

BACKGROUND

A variety of online shopping portals offer fashion products suitable for shoppers with varied fashion interests. In general, such portals include visual content displaying the different fashion products to enable the shoppers to view and choose the products. It may be difficult to predict sales potential of the fashion products owing to large variation in shoppers interests that in-turn may be dependent on demography, fashion trends etc. As a result, it may be difficult for the manufacturers to predict the sellability of the fashion products to manage inventory for such products.

Certain sales prediction techniques used by fashion e-commerce platforms to predict sales potential of fashion products are based on historical sales data of the fashion products. However, such prediction techniques may be time consuming and may provide inaccurate predictions. In addition, such techniques may not account for intrinsic factors associated with the fashion styles such as colour, fabric, aesthetics as well as extrinsic factors such as brand, price etc.

Certain fashion e-commerce platforms use prediction techniques that involve grading of fashion products based on their platform merchandising values (e.g. Gross Margin, Revenue, entities sold etc.) alone and may not consider the relationship with visual aspects of the fashion products. Therefore, there is a need for an efficient prediction system that can accurately determine sales potential of fashion products/fashion styles.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide a system and method for prediction of sellability of a fashion product Briefly, according to an example embodiment, a system for prediction of sellability of a fashion product is provided. The system includes a memory having computer readable instructions stored therein. The system further includes a processor configured to access one or more catalogue images of a fashion product. The processor is configured to determine a plurality of visual attributes of the fashion product. The processor is further configured to determine a plurality of non-visual attributes corresponding to the fashion product. In addition, the processor is further configured to estimate a first sellability confidence value for the reference fashion style using a deep learning model. The first sellability confidence value is estimated based upon the visual attributes. Furthermore, the processor is configured to estimate a second sellability confidence value for the reference fashion style using a non-visual parameter model. The second sellability confidence value is estimated based upon the non-visual attributes. Moreover, the processor further configured to combine the first and second sellability confidence values to determine an aggregate sellability confidence value associated with the reference fashion style.

According to another example embodiment, a system for prediction of sellability of a fashion product is provided. The system includes a memory having computer-readable instructions stored therein. The system further includes a processor configured to access sales data of a plurality of fashion styles. Each of the plurality of fashion styles includes a sales tag based upon the sales data. The processor is configured to train a deep learning model using the sales data and visual attributes of each of the plurality of fashion styles to generate a first co-relation matrix of the sales tags and the visual attributes of each of the fashion styles. The processor is further configured to train a non-visual parameter model using the sales data and non-visual attributes of each of the plurality of fashion styles to generate a second co-relation matrix of the sales tags and the non-visual attributes of each of the fashion styles. Further, the processor configured to access one or more images of a fashion product associated with a reference fashion style and determine a plurality of visual and non-visual attributes of the fashion product. Furthermore, the processor is configured to estimate a first sellability confidence value for the reference fashion style using the deep learning model. In addition, the processor is configured to estimate a second sellability confidence value for the reference fashion style using a non-visual parameter model. Moreover, the processor further configured to combine the first and second sellability confidence values to determine an aggregate sellability confidence value associated with the reference fashion style.

According to another example embodiment, a method for predicting sellability of a fashion product is provided. The method comprises accessing one or more catalogue images of a fashion product associated with a reference fashion style. The method further comprises determining a plurality of visual attributes and non-visual attributes corresponding to the fashion product. In addition, the method comprises estimating a first sellability confidence value for the reference fashion style using a deep learning model. The first sellability confidence value is estimated based upon the visual attributes. Similarly, the method comprises estimating a second sellability confidence value for the reference fashion style using a non-visual parameter model. The second sellability confidence value is estimated based upon the non-visual attributes. The method further comprises combining the first and second sellability confidence values to determine an aggregate sellability confidence value associated with the reference fashion style.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein:

FIG. 4-A illustrates example data such as images of a fashion product used by the system of FIG. 1 to predict sellability of new fashion styles, according to the aspects of the present technique;

FIG. 4-B shows an image of a new reference style of a top wear;

FIGS. 5-A and 5-B, illustrate catalogue images of exemplary fashion products along with their corresponding segmented versions for prediction of sellablity of fashion products;

DETAILED DESCRIPTION OF EXAMPLE EMBODIMENTS

Figure 1:
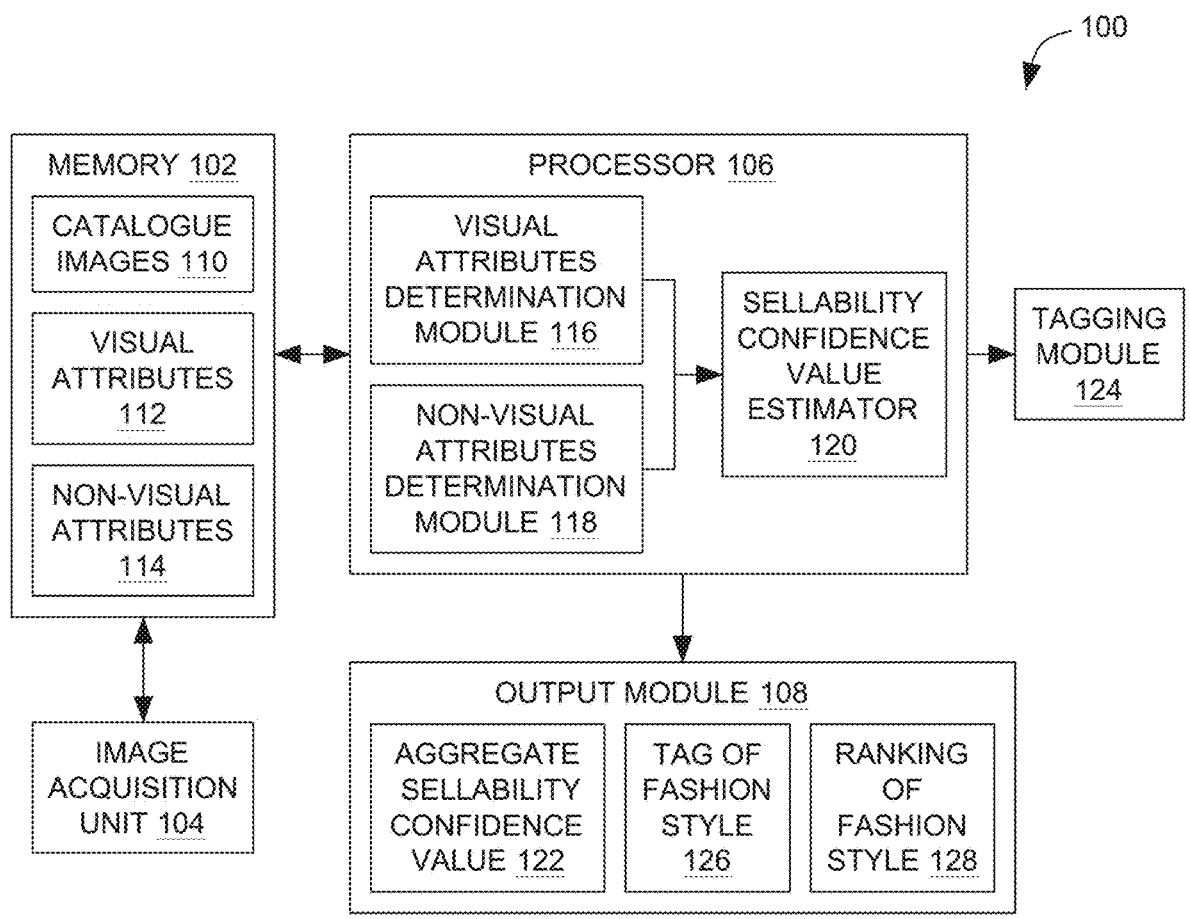
FIG. 1 illustrates a block diagram illustrating a system for prediction of sellablity of fashion products, according to an example embodiment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in 'addition to the orientation depicted in the figures. For example, if the device in the figures is turned over, elements described as "below" or "beneath" other elements or features would then be oriented "above" the other elements or features. Thus, term such as "below" may encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The device(s)/apparatus(es), described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described example embodiments of the inventive concept may be implemented with program instructions which may be executed by computer or processor and may be recorded in computer-readable media. The media may also include, alone or in combination with the program instructions, data files, data structures, and the like. The program instructions recorded in the media may be designed and configured especially for the example embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to execute one or more software modules to perform the operations of the above-described example embodiments of the inventive concept, or vice versa.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one example embodiment is generally directed to a system for prediction of sellability of fashion products such as available for sale on an e-commerce platform.

FIG. 1 is a block diagram illustrating a system 100 for prediction of sellablity of fashion products. The system 100 includes a memory 102, an image acquisition unit 104, a processor 106 and an output module 108. Each component is described in further detail below.

The image acquisition unit 104 is configured to access one or more catalogue images 110 of a plurality of fashion products associated with a reference fashion style such as available on a fashion e-commerce website. These images may include images with various different views of the same style with a human model wearing them or may include a flat shot of the fashion product. In some embodiments, such catalogue images 110 may be stored in the memory 102. In an embodiment, the catalogue image 110 may be an image of a fashion product such as an image of a top wear, a bottom wear, footwear, a bag, and the like. In some embodiments, the image acquisition unit 104 may be configured to access the catalogue images 110 from other locations such as from an offline image repository, cloud storage and so forth.

The processor 106 includes a visual attributes determination module 116, a non-visual attributes determination module 118 and a sellability confidence value estimator 120. The processor 106 is communicatively coupled to the image acquisition unit 104 and to the memory 102 and is configured to access the catalogue images 110 of a plurality of fashion products associated with the reference fashion style. The visual attributes determination module 116 is configured to determine a plurality of visual attributes 112 of the fashion products. Similarly, the non-visual attributes determination module 118 is configured to determine the non-visual attributes 114 corresponding to the fashion products. Such visual attributes 112 and the non-visual attributes 114 may be stored in the memory 102.

In this embodiment, the visual attributes 112 include visual features associated with the fashion products that may be indicative of the fashion product's potential to be a top seller or a bottom seller. As used herein, the term "top seller" refers to the fashion styles/products that are selling well via an e-commerce platform during a certain time period. Further, the term "bottom seller" refers to the fashion styles/products that are relatively not selling well via the e-commerce platform during a certain time period. In some examples, the visual attributes 112 of the fashion product, may include visual attributes associated with body, sleeves, collar, placket, pockets, leg parts, waist, crest, graphics, or combinations thereof of the fashion products.

Moreover, the memory 102 is configured to store the non-visual attributes 114 corresponding to the fashion products. As used herein, the term "non-visual attributes" refer to attributes that cannot be inferred from an image of the fashion products but do effect the sales potential of the fashion product. For example, the non-visual attributes 114 of the fashion products may include brand, fabric, price, discount, or combinations thereof of the fashion products. A combination of the non-visual attributes 114 in conjunction with the visual attributes 112 can be utilized to determine optimal parameters for some of the non-visual attributes 114. For example, for a given fabric and brand, a fashion style can be priced in a certain range. The optimal price can be determined by changing the price values in this range for it to be a top seller.

The sellability confidence value estimator 120 is configured to estimate a first sellability confidence value for the reference fashion style based upon the visual attributes 112. In one embodiment, the sellability confidence value estimator 120 uses a deep learning model to estimate the first sellability confidence value based upon the visual attributes 112. Moreover, the sellability confidence value estimator 120 is configured to estimate a second sellablity confidence value for the reference fashion style based upon the non-visual attributes 114. In this embodiment, the sellability confidence value estimator 120 uses a non-visual parameter model to estimate the second sellablity confidence value based upon the non-visual attributes 114. The sellability confidence value estimator 120 is further configured to combine the first and second sellablity confidence values to determine an aggregate sellability confidence value 122 associated with the reference fashion style. In one embodiment, the sellability confidence value estimator 120 is configured to combine the first and second sellablity confidence values using a weighted average technique to determine the aggregate sellability confidence value 122. However, other suitable techniques may be envisaged. The aggregate sellability confidence value 122 may be displayed to a user via the output module 108.

In some examples, the processor 106 may be configured to access prior sales data of fashion styles substantially similar to the reference fashion style. Such sales data may include revenue generated, quantity sold, click through rate and so forth. Moreover, the deep learning and the non-visual parameter models may be trained based upon the prior sales data and the visual and non-visual attributes 112 and 114 respectively. In some examples, factors affecting sales data such as visibility and product discounts are normalized and such normalized sales data may be used to classify the reference fashion styles.

The deep learning model and the non-visual parameter models may be used to predict the sellability of the reference fashion style. The deep learning model is utilized to learn the visual embeddings of the fashion styles. Examples of such models include, but are not limited to, AlexNet, GoogleNet, VGG and ResNet. In one example, segmentation masks are applied to the catalogue images 110 to train the deep learning model. The catalogue images and their segmentation masks may both be used to learn the visual embedding. Examples of such images and the respective segmentation masks are described later with reference to FIGS. 5A and 5B. Moreover, several classifiers may be used to predict the sellability of styles using the non-visual parameters. Examples of such classifiers include, but are not limited to, Logistic Regression, Support Vector Machines and Decision Trees.

While the proposed methods will specifically help in identifying top and bottom sellers of a given fashion product/style, they can also be extended to identify combinations of various products that are likely to sell well. For example, combinations of top wear and bottom wear items that are likely to be top sellers can be identified by using their visual and non-visual attributes. Similarly, the colour harmony between the top wear and bottom wear will be automatically learnt by the deep learning model. In addition to colour, other attributes (e.g., pattern, print, fit) of the top wear and bottom wear may be comparatively evaluated for harmony. Thus, the methods well help in recommending suitable fashion product combinations or outfits to customers.

In some examples, the deep learning model and the non-visual parameter models may be updated from time-to-time such as based upon a type of season, geographical location, fashion trends and so forth.

In alternate embodiments, the sellability confidence value estimator 120 may utilize an appropriate model that estimates the aggregate sellability confidence value 122 using both the visual attributes 112 and the non-visual attributes 114. Further, the processor includes a tagging module 124 configured to tag the reference fashion style based upon the aggregate sellability confidence value 122. The reference fashion style may be tagged as a top seller, a bottom seller, or a medium seller. Moreover, the tagging module 124 may be configured to identify and rank a plurality of fashion styles based on the aggregate sellability confidence values 122.

The memory 102 is configured to store the one or more catalogue images 110 of the fashion products. In an embodiment, the catalogue image 110 may be an image of a fashion product such as an image of a top wear, a bottom wear, footwear, a bag, and the like. In addition, the memory 102 is configured to store a plurality of attributes corresponding to the fashion product such as visual attributes 112 including their deep learnt embeddings and non-visual attributes 114. In certain embodiments, the memory 102 is configured to store the sellability confidence values for the reference fashion styles along with the associated tags.

The output module 108 may display the aggregate sellability confidence values 122, tags of the fashion styles 126 and rankings of the fashion styles 128 to a user of the system 100.

Figure 2:
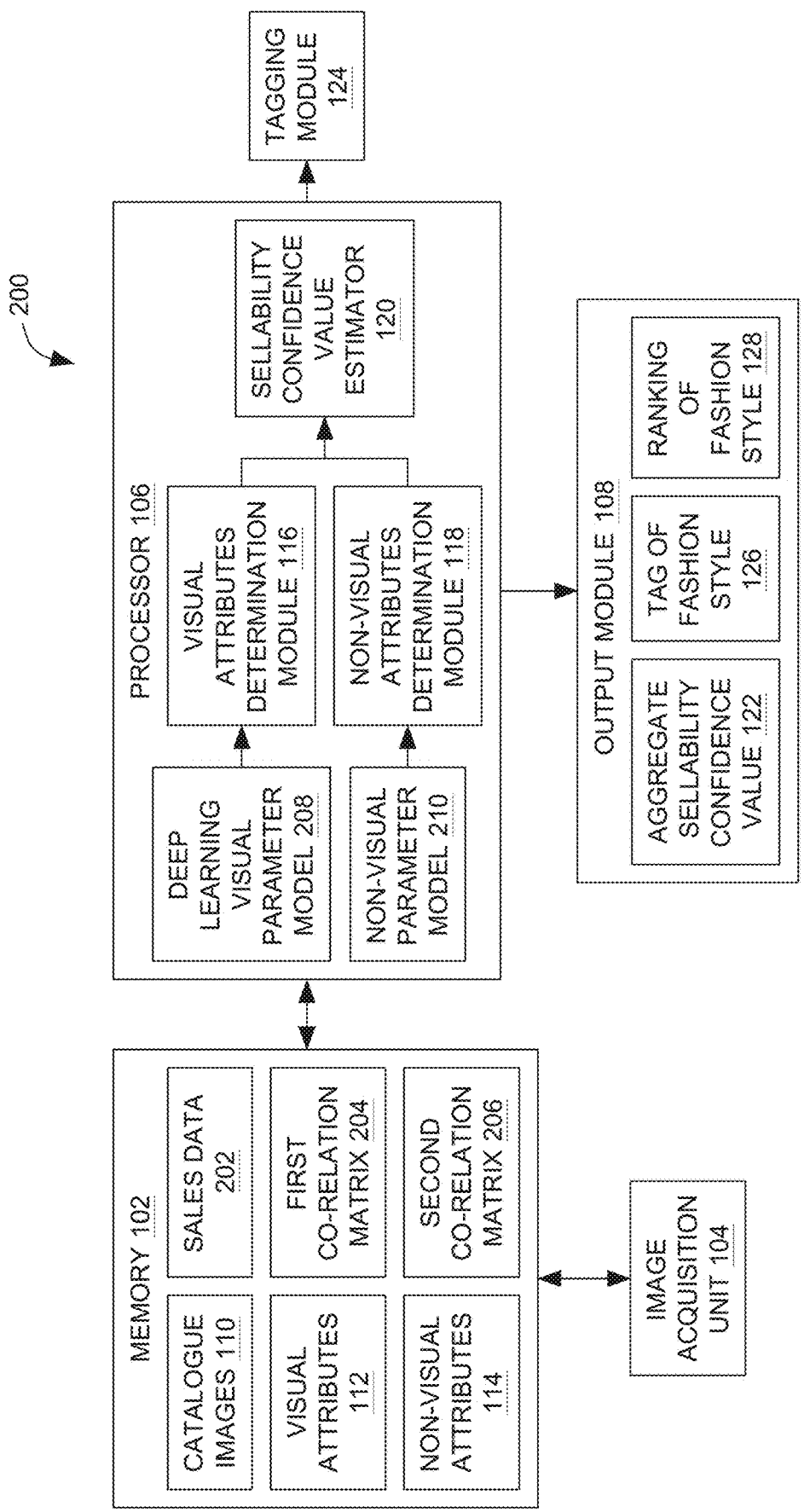
FIG. 2 is a block diagram illustrating another embodiment of the system of FIG. 1.

FIG. 2 is a block diagram illustrating another embodiment 200 of the system 100 of FIG. 1, as with the embodiment of FIG. 1, the system 200 includes the memory 102, the image acquisition unit 104, the processor 106 and the output module 108.

In this embodiment, the processor 106 is further configured to access sales data 202 of the plurality of fashion products associated with the reference fashion styles. Such sales data 202 may include generated revenue, quantity sold, click through rate and so forth. In some embodiments, the sales data can be normalized by parameters such as visibility and discount to reduce biases created on a fashion e-commerce platform. In some embodiments, such prior sales data 202 may be stored in the memory 102. The sales data 202 may be used by the processor 106 to train a deep learning model 208 and a non-visual parameter model 210.

In one embodiment, the plurality of fashion products/styles may have an associated sales tag based upon the sales data 202. In this example, the deep learning model 208 may be trained using the sales data 202 and the visual attributes 112 of each of the plurality of fashion products to generate a first co-relation matrix 204 of the sales tags and the visual attributes 112 of each of the fashion styles. Further the non-visual parameter model 210 may be trained using the sales data 202 and the non-visual attributes 114 of each of the plurality of fashion styles to generate a second co-relation matrix 206 of the sales tags and the non-visual attributes 114 of each of the fashion styles. These first second co-relation matrices 204 and 206 respectively may be stored in the memory 102.

As used herein, the first co-relation matrix 204 defines a relationship and/or co-relation between sellability confidence values for the reference fashion styles along with the associated tags and visual attributes 112 of each of the fashion styles. Moreover, the second co-relation matrix 206 defines co-relation between sellablity confidences value and non-visual attributes 114 of each of the fashion styles. Such co-relation matrices 204 and 206 may be used to train the deep learning model 208 and the non-visual parameter model 210 for estimation of the sellability confidence values for new fashion styles.

In operation, the processor 106 is configured to access the one or more catalogue images 110 of a plurality of fashion products associated with a reference fashion style such as available on a fashion e-commerce website. The visual attributes determination module 116 determines the visual attributes 112, corresponding to the plurality of the fashion products shown in the accessed catalogue image. Similarly, the non-visual attributes determination module 118 determines the non-visual attributes 114 corresponding to the plurality of the fashion products shown in the accessed catalogue image. Such visual attributes 112 and the non-visual attributes 114 may be stored in the memory 102.

Further the sellability confidence value estimator 120 uses the trained deep learning model 208 to estimate the first sellability confidence value based upon the visual attributes 112. Moreover, the sellability confidence value estimator 120 uses the trained non-visual parameter model 210 to estimate a second sellablity confidence value for the reference fashion style based upon the non-visual attributes 114. In this embodiment, the deep learning model 208 is configured to access the first co-relation matrix 204 to estimate the first sellability confidence value. Further, the non-visual parameter model 210 is configured to access the second co-relation matrix 206 to estimate the second sellability confidence value. The sellability confidence value estimator 120 is further configured to combine the first and second sellablity confidence values to determine the aggregate sellability confidence value 122 associated with the reference fashion style. Again, the parameters such as the aggregate sellability confidence value 122, tags of the fashion styles 126 and rankings of the fashion styles 128 may be displayed to a user via the output module 108.

Figure 3:
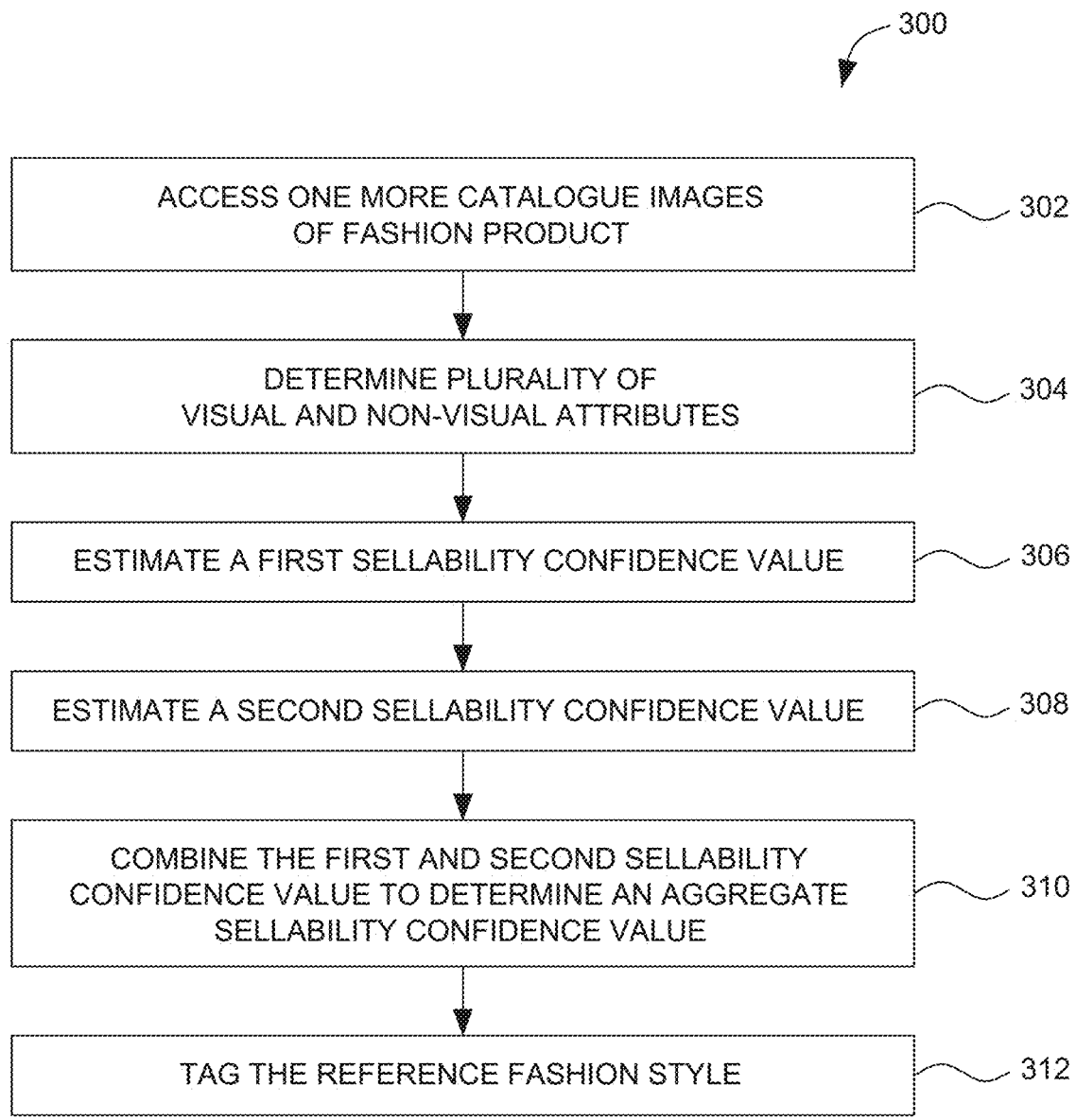
FIG. 3 is an example process for predicting sellability of a fashion product, using the system of FIG. 1, according to the aspects of the present technique.

FIG. 3 is an example process 300 for predicting sellability of a fashion product, using the system of FIG. 1, according to the aspects of the present technique.

At step 302, one or more images 110 of a fashion product associated with a reference fashion style are accessed. In an embodiment, the one or more images 110 include catalogue images of a fashion product such a top wear, a bottom wear, footwear, a bag, and the like. In some embodiments, the catalogue images 110 are accessed from locations such as from an offline image repository, cloud storage and so forth. These images may include images with various different views of the same style with a human model wearing them or may include a flat shot of the fashion product. The segmentation masks of the article type of interest (e.g., t-shirt) will be calculated. Both the catalogue images and their segmentation masks will be assigned the same label as a top or bottom seller and will be used to train the deep learning model 208.

At step 304, a plurality of visual and non-visual attributes 112 and 114 respectively corresponding to the fashion product are determined. In an embodiment, the visual attributes 112 may include visual attributes associated with body, sleeves, collar, placket, pockets, leg parts, waist, crest, graphics, or their combinations of the fashion product. Such attributes will also include the deep learnt embeddings corresponding to top or bottom seller identification model and deep learnt models may be trained to identify various visual attributes. Moreover, the non-visual attributes 114 corresponding to the fashion product may include brand, fabric, price, discount, or their combinations of the fashion product.

At step 306, a first sellability confidence value is estimated for the reference fashion style using the processor 106. The first sellability confidence value is estimated using a deep learning model based upon the visual attributes. In an embodiment, the deep learning network is employed to learn embedding's of the fashion products to capture their sales potential. Examples of deep learning models include, but are not limited to, AlexNet, GoogleNet, VGG and ResNet.

At step 308, a second sellability confidence value is estimated for the reference fashion style using the processor 106. The second sellability confidence value is estimated using a non-visual parameter model based upon the non-visual attributes. In an embodiment, the non-visual parameter model is built to learn the catalogue image agnostic features like Brand, MRP and Fabric that influence the sellability of the fashion product. In another aspect of the invention, a vocabulary of these features is built using one hot encoding and the model is trained using the dataset.

At step 310, the first and second sellability confidence values are combined to determine an aggregate sellablity confidence value associated with the reference fashion style. In some embodiments, an ensemble model is built by considering outputs of the deep learning and the non-visual parameter models. The ensemble model may be employed to combine the first sellability confidence value and second sellability confidence value to determine the aggregate sellablity confidence value associated with the fashion product.

Further, at step 312, the reference fashion style is tagged as a top seller, a bottom seller, or a medium seller based upon the aggregate sellability confidence value. In some embodiments, a weighted average of the first and second sellability confidence values is estimated and accordingly the fashion product is tagged as a top seller or a bottom seller. In one example of the invention the weights are learnt using cross-validation technique. In some embodiments, a plurality of fashion styles are ranked based upon their respective aggregate sellability confidence values and manufacturers/retailers utilize such rankings to plan the products inventory and/or manufacturing of the fashion styles.

FIG. 4-A illustrates example data such as images 400 of a fashion product used by the system 100 of FIG. 1 to predict sellability of new fashion styles. The image 400 includes a plurality of images showing deep learnt activations of a person/model wearing a top wear in 402. In this example, a deep learnt model is trained to learn one or more visual aspects of a style to classify it as a top or bottom seller. Moreover, the deep learnt network utilises the fashion elements corresponding to these activations to classify a given catalogue image as a top or bottom seller. As can be seen, the data used to train the model may include images of styles and each of these styles may have a tag such as a Top Seller (TS) or Bottom Seller (BS) tag associated with them. The label TS or BS may be assigned based on the sales metrics, after normalizing the factors such as discounts, visibility etc. The model is thereby trained to associate the visual attributes of the style with its sellability (e.g., represented by TS/BS confidence values). In this example, the deep learning model automatically localizes on a logo or graphics print or sleeve or collar of the top wear and thus ranks it accordingly based on the discriminating design elements.

FIG. 4-B shows an image 402 of a new reference style of a top wear. The activations from the deep learning model such as illustrated in FIG. 4A may be used to predict the TS/BS label of the new reference style and the confidence value for the given new style illustrated in the image 402. As would be appreciated with one skilled in the art a non-visual parameter model may be similarly used to predict the TS/BS label of the new reference style. In some examples, an ensemble of the deep learning model and the non-visual parameter model may also be used to predict the TS/BS label of the new reference style.

FIGS. 5-A and 5-B illustrates catalogue images 500 and 502 of exemplary fashion products with their corresponding segmentation masks. As described earlier with reference to FIG. 1, the top seller or bottom seller labels associated with the catalogue images 110 are used to train a model such as a classification model that can classify a given catalogue image as a top seller or bottom seller. Further, the classification model can also be trained to include other labels such as medium seller. Moreover, as shown in images 500 and 502 both the catalogue images and their corresponding segmentation masks may be used to train the deep learning model 208 to localize fashion elements that are present in a given catalogue image and not the human model wearing the item (e.g., face, skin) or the background or other fashion items present in the image (e.g., shoes, bags). In one embodiment, the classification model will further be trained for a given fashion product type (e.g., t-shirts, trousers, dresses). For example, if the deep learning model is trained for a top wear item (e.g., shirt, t-shirt), it will not localize to the bottom wear in the catalogue image (e.g., jeans, trousers being worn by the model).

Similarly, the deep learning model 208 will determine fashion elements of the catalogue image that are similar for all the top selling styles and the bottom selling styles respectively. In another example, the deep learning model 208 will also identify fashion elements that are differentiating between the top and bottom selling catalogue items. Referring back to FIG. 4-A, the fashion elements thus identified for the catalogue image in FIG. 4-B, based on the activations from the trained deep learning model 208. The label for a given catalogue image as top or bottom seller will be predicted based on these fashion elements. Moreover, the deep learnt model 208 may be trained to directly classify a given catalogue image as a top or bottom seller. In one example, the deep learning model 208 may be trained to identify specific attributes from the catalogue image such as collar, pattern, sleeve type, sleeve length, body length. For example, the pattern model can classify a given catalogue image as solid, stripe, check, print or colour block. In another embodiment, the embeddings from the deep learnt attribute model 208 can also be used for top or bottom seller classification. The embeddings will typically be derived from the penultimate layer of the deep learnt model. In addition, the embeddings can also be derived from the earlier layers of the deep learnt model 208.

Figure 6:
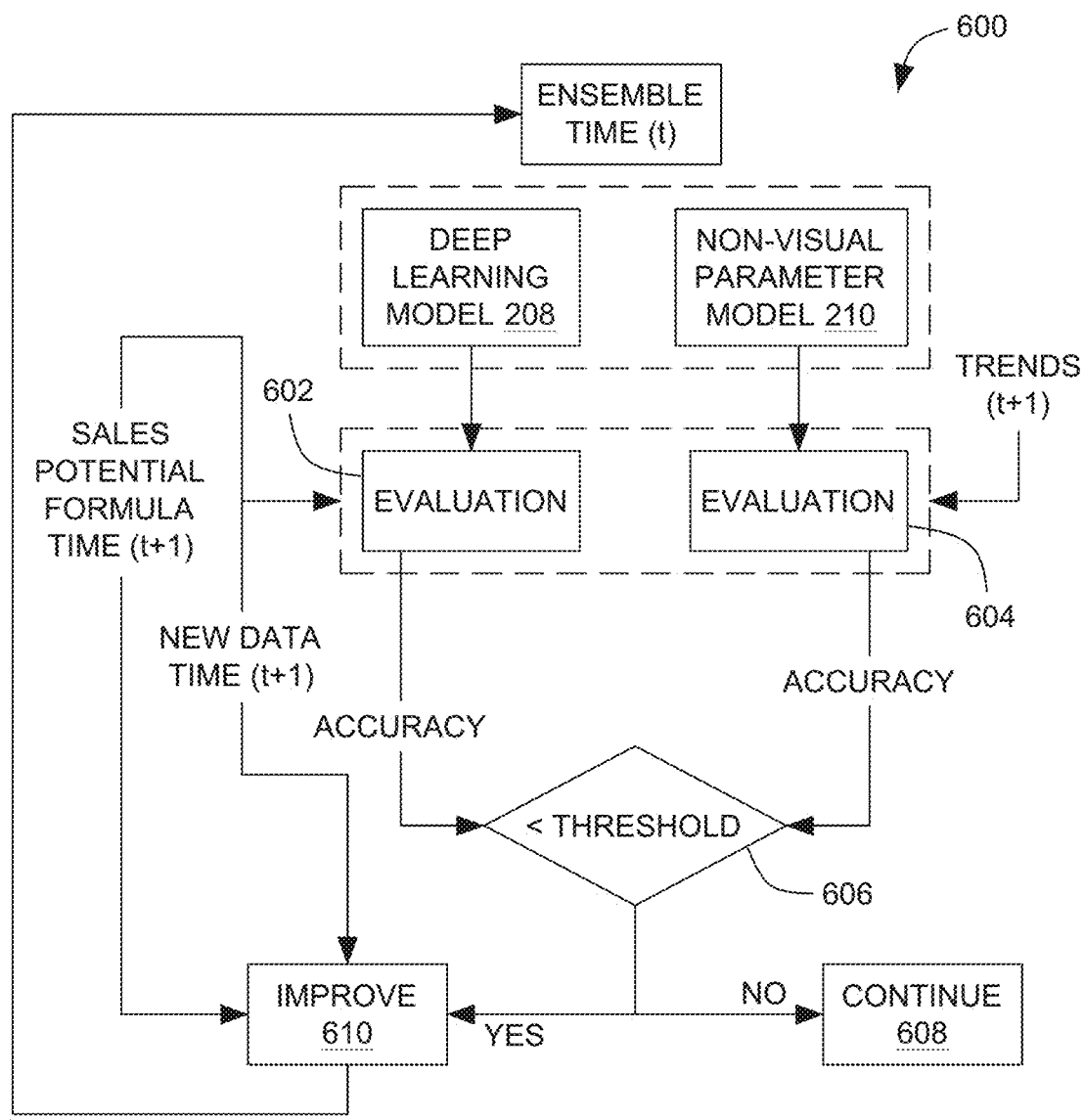
FIG. 6 is an example illustration of a process of updation of models used for prediction of sellablity of fashion products in the system of FIG. 1.

The deep learning model 208 and the non-visual parameter model 210 such as described above may be updated from time-to-time such as based upon a type of season, geographical location, fashion trends and so forth. FIG. 6 is an example illustration of a process 600 of updation of such models.

In certain embodiments, the models such as the deep learning model 208 and the non-visual parameter model 210 may be built for a given fashion product type such as by using top seller and bottom seller data for a given period of time "t" for the respective fashion product. In some examples, the models 208 and 210 developed and/or trained at time "t" may not be effective over a period of time and may have to be updated from time to time. At step 602, the deep learning model 208 may be evaluated to determine its accuracy at another time such as represented by t+1. Similarly, at step 604, the non-visual parameter model 210 may be evaluated to determine its accuracy at time t+1. Here, current input data at time "t+1" may be provided to the models 208 and 210. For example, the current input data may include fashion trends that may vary across seasons and different geographies. For example, the fashion products bought during winter may or may not be a top seller in summer and vice versa. Hence the models 208 and 210 may be dynamically updated to verify that the model trained for time t is valid for time t+1.

At step 606, the estimated accuracy for both the models 208 and 210 are compared with pre-determined threshold values. Such threshold values may be provided by the user of the system. If the estimated accuracy of each of the deep learning model 208 and the non-visual parameter model 210, is within the pre-determined threshold values then the estimation of the sellability confidence value is performed with the current models 208 and 210, as represented by reference numeral 608. Alternatively, if the estimated accuracy of each of the deep learning model 208 and the non-visual parameter model 210, is not within the pre-determined threshold values then the models 208 and 210 may be updated as indicated by reference numeral 610 and the updated models may be used for estimation of the sellability confidence value for the fashion products. In some examples, updated data (at time t+1) such as sales potential formula, catalogue images at t+1 and trends etc. may be used as input in updation of the models 208 and 210.

Figure 7:
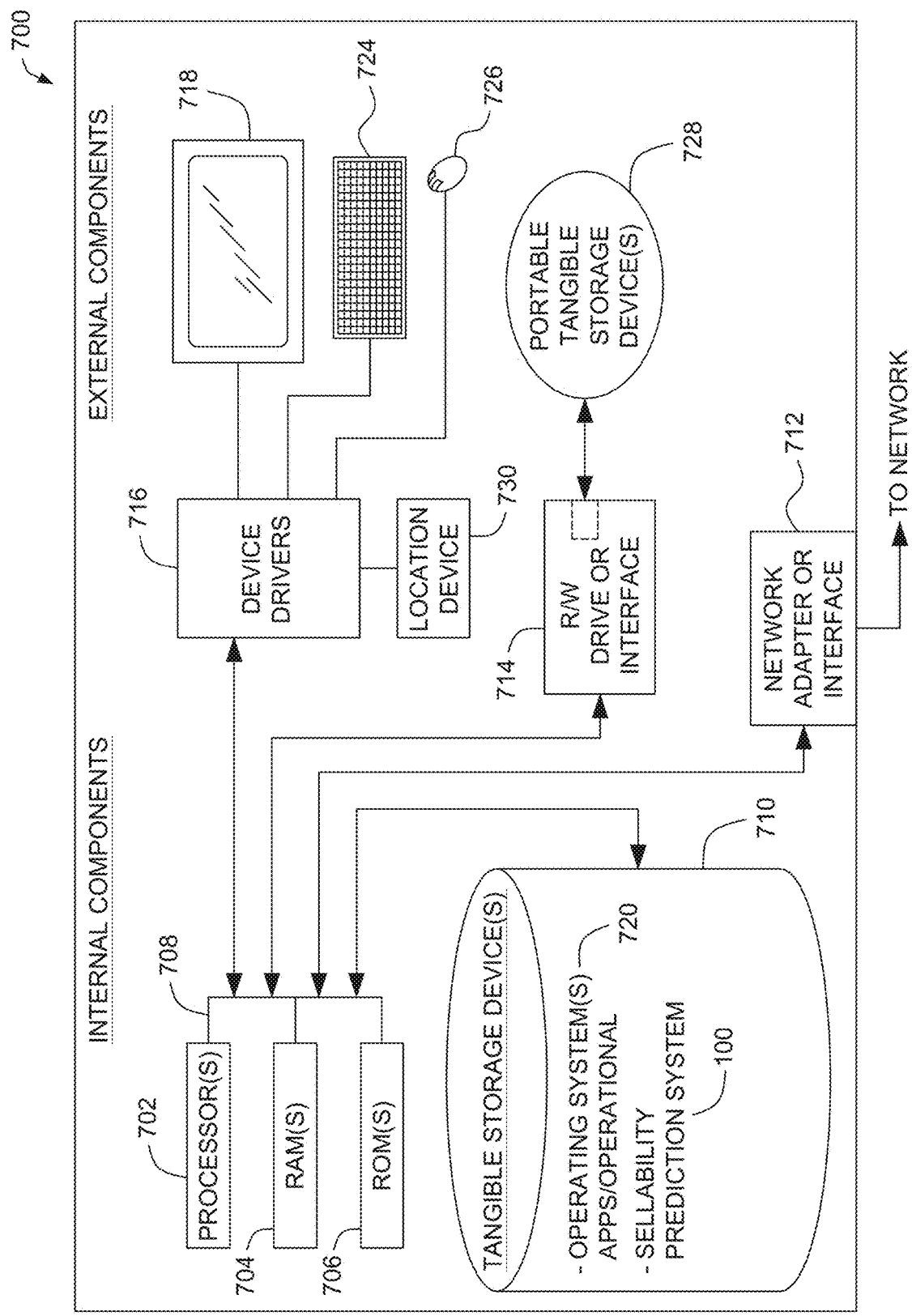
FIG. 7 is a block diagram of an embodiment of a computing device in which the modules of the sellability prediction system, described herein, are implemented.

The modules of system 100 for prediction of sellablity of fashion products described herein are implemented in computing devices. One example of a computing device 700 is described below in FIG. 7. The computing device includes one or more processor 702, one or more computer-readable RAMs 704 and one or more computer-readable ROMs 706 on one or more buses 708. Further, computing device 700 includes a tangible storage device 710 that may be used to execute operating systems 720 and the sales prediction system 100. The various modules of the sellability prediction system 100 include a processor 106, a memory 102, an output module 108 and image acquisition unit 104. The processor 106 further includes a visual attributes determination module 116, a non-visual attributes determination module 118 and a sellability confidence value estimator 120. Both, the operating system 720 and the system 100 are executed by processor 702 via one or more respective RAMs 704 (which typically include cache memory). The execution of the operating system 720 and/or the system 100 by the processor 702, configures the processor 702 as a special purpose processor configured to carry out the functionalities of the operation system 720 and/or the sales prediction system 100, as described above.

Examples of storage devices 710 include semiconductor storage devices such as ROM 706, EPROM, flash memory or any other computer-readable tangible storage device that may store a computer program and digital information.

Computing device also includes a R/W drive or interface 714 to read from and write to one or more portable computer-readable tangible storage devices 728 such as a CD-ROM, DVD, memory stick or semiconductor storage device. Further, network adapters or interfaces 712 such as a TCP/IP adapter cards, wireless Wi-Fi interface cards, or 3G or 4G wireless interface cards or other wired or wireless communication links are also included in computing device.

In one example embodiment, the sellability prediction system 100 which includes a processor 106, a memory 102, an output module 108 and image acquisition unit 104, may be stored in tangible storage device 710 and may be downloaded from an external computer via a network (for example, the Internet, a local area network or other, wide area network) and network adapter or interface 712.

Computing device further includes device drivers 716 to interface with input and output devices. The input and output devices may include a computer display monitor 718, a keyboard 724, a keypad, a touch screen, a computer mouse 726, and/or some other suitable input device.

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The aforementioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The example embodiment or each example embodiment should not be understood as a limiting/restrictive of inventive concepts. Rather, numerous variations and modifications are possible in the context of the present disclosure, in particular those variants and combinations which may be inferred by the person skilled in the art with regard to achieving the object for example by combination or modification of individual features or elements or method steps that are described in connection with the general or specific part of the description and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure.

Still further, any one of the above-described and other example features of example embodiments may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one example embodiment relates to a non-transitory computer-readable storage medium comprising electronically readable control information (e.g., computer-readable instructions) stored thereon, configured such that when the storage medium is used in a controller of a magnetic resonance device, at least one example embodiment of the method is carried out.

Even further, any of the aforementioned methods may be embodied in the form of a program. The program may be stored on a non-transitory computer readable medium, such that when run on a computer device (e.g., a processor), cause the computer-device to perform any one of the aforementioned methods. Thus, the non-transitory, tangible computer readable medium is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it may be separated from the computer device main body. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave), the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices), volatile memory devices (including, for example static random access memory devices or a dynamic random access memory devices), magnetic storage media (including, for example an analog or digital magnetic tape or a hard disk drive), and optical storage media (including, for example a CD, a DVD, or a Blu-ray Disc). Examples of the media with a built-in rewriteable non-volatile memory, include but are not limited to memory cards, and media with a built-in ROM, including but not limited to ROM cassettes, etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

The invention claimed is:

1. A system for predicting sellability, the system comprising:

a memory having computer-readable instructions stored therein; and a processor that, when executing the computer-readable instructions, is configured to:

access a plurality of images of fashion products associated with a reference fashion style;

determine, based on the plurality of images of the fashion products, a plurality of visual attributes of the fashion products;

determine a plurality of non-visual attributes corresponding to the fashion products;

generate a first co-relation matrix that defines a relationship between a first sellability confidence value and the visual attributes;

generate a second co-relation matrix that defines a relationship between a second sellability confidence value and the non-visual attributes;

train a deep learning model using the first co-relation matrix;

train a parameter model using the second co-relation matrix;

estimate, based on the plurality of visual attributes, a first sellability confidence value for the reference fashion style using the trained deep learning model;

estimate, based on the plurality of non-visual attributes, a second sellability confidence value for the reference fashion style using the trained parameter model;

determine, based on the first and second sellability confidence values, an aggregate sellability confidence value associated with the reference fashion style;

tag, based upon the aggregate sellability confidence value, the reference fashion style with one of a plurality of predetermined categories;

responsive to at least one of (i) a current time of year satisfying a criterion or (ii) an accuracy of the first and/or second sellability confidence values satisfying one or more criteria, update at least one of the deep learning model or the parameter model; and estimate one or more other sellability confidence values for another reference fashion style using the retrained at least one updated model.

2. The system of claim 1, wherein the plurality of images of the fashion products comprise a plurality of images of top wear, bottom wear, foot wear, bags, or combinations thereof.

3. The system of claim 1, wherein the plurality of visual attributes of the fashion products comprise body, sleeves, collar, placket, pockets, leg parts, waist, crest, graphics, or combinations thereof.

4. The system of claim 1, wherein the non-visual attributes corresponding to the fashion products comprise brand, fabric, price, discount, or combinations thereof.

5. The system of claim 1, wherein the processor is configured to execute the computer-readable instructions to determine the aggregate sellability confidence value associated with the reference fashion style using a weighted average of the first and second sellability confidence values.

6. The system of claim 1, wherein the plurality of predetermined categories comprise a top seller, a bottom seller, or a medium seller.

7. The system of claim 1, wherein the processor is further configured to execute the computer-readable instructions to:

access prior sales data of fashion styles substantially similar to the reference fashion style;

train the deep learning model and the parameter model based on the prior sales data and the visual and non-visual attributes of the fashion styles; and utilize the deep learning model and the parameter model to predict sellability of the reference fashion style.

8. The system of claim 1, wherein the processor is further configured to execute the computer-readable instructions to update the deep learning model and the parameter model based on a type of season, geographical location, fashion trends, or combinations thereof.

9. A system for prediction of sellability of a fashion product, the system comprising:

a memory having computer-readable instructions stored therein; and a processor that, when executing the computer-readable instructions, is configured to:

access sales data of a plurality of fashion styles, wherein each of the plurality of fashion styles comprises a sales tag based on the sales data;

generate a first co-relation matrix that defines a relationship between a first sellability confidence value and visual attributes;

generate a second co-relation matrix that defines a relationship between a second sellability confidence value and non-visual attributes;

train a deep learning model using the sales data, the first co-relation matrix, and the visual attributes of each of the plurality of fashion styles;

train a parameter model using the sales data, the second co-relation matrix, and the non-visual attributes of each of the plurality of fashion styles;

access a plurality of images of fashion products associated with a reference fashion style;

determine, based on the plurality of images of the fashion products, a plurality of visual attributes of the fashion products;

determine a plurality of non-visual attributes corresponding to the fashion products;

estimate, based on the plurality of visual attributes, a first sellability confidence value for the reference fashion style using the trained deep learning model;

estimate, based on the plurality of non-visual attributes, a second sellability confidence value for the reference fashion style using the trained parameter model;

determine, based on the first and second sellability confidence values, an aggregate sellability confidence value associated with the reference fashion style;

tag, based upon the aggregate sellability confidence value, the reference fashion style with one of a plurality of predetermined categories;

responsive to at least one of (i) a current time of year satisfying a criterion or (ii) an accuracy of the first and/or second sellability confidence values satisfying one or more criteria, update at least one of the deep learning model or the parameter model; and estimate one or more other sellability confidence values for another reference fashion style using the at least one updated model.

10. The system of claim 9, wherein the plurality of images of the fashion products comprise a plurality of images top wear, bottom wear, foot wear, bags, or combinations thereof.

11. The system of claim 9, wherein the plurality of visual attributes of the fashion products comprise body, sleeves, collar, placket, pockets, leg parts, waist, crest, graphics, or combinations thereof.

12. The system of claim 9, wherein the non-visual attributes comprise brand, fabric, price, or combinations thereof.

13. The system of claim 9, wherein the plurality of predetermined categories comprise a top seller, a bottom seller, or a medium seller.

14. The system of claim 9, wherein the processor is further configured to execute the computer-readable instructions to estimate the first and second sellability confidence values.

15. The system of claim 9, wherein the processor is further configured to execute the computer-readable instructions to rank the plurality of fashion styles based upon the aggregate sellability confidence values.

16. A computer-implemented method for predicting sellability, the method comprising:
    accessing a plurality of images of fashion products associated with a reference fashion style;
    determining, based on the plurality of images of the fashion products, a plurality of visual attributes and non-visual attributes corresponding to the fashion products;
    generating a first co-relation matrix that defines a relationship between a first sellability confidence value and the plurality of visual attributes;
    generating a second co-relation matrix that defines a relationship between a second sellability confidence value and the plurality of non-visual attributes;
    training a deep learning model using the first co-relation matrix;
    training a parameter model using the second co-relation matrix;
    estimating, based on the plurality of visual attributes, a first sellability confidence value for the reference fashion style using the trained deep learning model;
    estimating, based on the plurality of non-visual attributes, a second sellability confidence value for the reference fashion style using the trained parameter model;
    determining, based on the first and second sellability confidence values, an aggregate sellability confidence value associated with the reference fashion style;
    tagging, based upon the aggregate sellability confidence value, the reference fashion style with one of a plurality of predetermined categories;
    responsive to at least one of (i) a current time of year satisfying a criterion or (ii) an accuracy of the first and/or second sellability confidence values satisfying one or more criteria, updating at least one of the deep learning model or the parameter model; and
    estimating one or more other sellability confidence values for another reference fashion style using the at least one updated model.

17. The computer-implemented method of claim 16, wherein the plurality of images of the fashion products comprise a plurality of images of top wear, bottom wear, foot wear, bags, or combinations thereof.

18. The computer-implemented method of claim 16, further comprising:
    accessing prior sales data of fashion styles substantially similar to the reference fashion style;
    training the deep learning model and the parameter model based on the prior sales data and the visual and non-visual attributes of the fashion styles; and
    predicting the sellability of the reference fashion style using the deep learning model and the parameter model.

19. The computer-implemented method of claim 16, wherein the plurality of predetermined categories comprise a top seller, a bottom seller, or a medium seller.

20. The computer-implemented method of claim 16, further comprising:
    ranking the fashion styles based upon the aggregate sellability confidence values.

* * * * *